US007081869B2

(12) United States Patent
Sommerfeld et al.

(10) Patent No.: US 7,081,869 B2
(45) Date of Patent: Jul. 25, 2006

(54) TEST FIXTURE FOR ASSEMBLED WIRELESS DEVICES

(75) Inventors: Tim Sommerfeld, Ariss (CA); Steve Green, Waterloo (CA); Liviu George, Mississauga (CA)

(73) Assignee: Research In Motion Limited, Waterloo (CA)

( * ) Notice: Subject to any disclaimer, the term of this patent is extended or adjusted under 35 U.S.C. 154(b) by 23 days.

(21) Appl. No.: 11/010,408

(22) Filed: Dec. 14, 2004

(65) Prior Publication Data

US 2006/0076961 A1    Apr. 13, 2006

Related U.S. Application Data

(60) Provisional application No. 60/617,657, filed on Oct. 13, 2004.

(51) Int. Cl.
*H01Q 1/50*  (2006.01)
*G01R 31/02*  (2006.01)

(52) U.S. Cl. ............ 343/906; 324/538; 324/754; 324/761; 324/158.1; 324/578

(58) Field of Classification Search .......... 343/906, 343/703, 909; 324/761, 538, 158.1, 578, 324/542
See application file for complete search history.

(56) References Cited

U.S. PATENT DOCUMENTS 5,175,493 A * 12/1992 Langgard ............. 324/761
5,945,835 A * 8/1999 McDonough et al. ...... 324/754
6,844,738 B1 * 1/2005 Kreager et al. ............ 324/538
6,863,564 B1 * 3/2005 Kreager et al. ............ 439/578
2002/0075010 A1  6/2002 Streed et al.
2004/0239334 A1 12/2004 Kreager et al.
2005/0212541 A1 * 9/2005 Ruff et al. ................ 324/761

OTHER PUBLICATIONS

International Search Report for PCT/CA2004/002131, Made by the Canadian Intellectual Property Office, Mailed Jul. 11, 2005.

* cited by examiner

*Primary Examiner*—Don Wong
*Assistant Examiner*—Chuc Tran
(74) *Attorney, Agent, or Firm*—Matthew M. Roy; Ogilvy Renault LLP

(57) ABSTRACT

A fixture for radio frequency ("RF") testing of an assembled wireless device, the wireless device having a removable casing concealing one or more RF spring connectors, the fixture comprising: a retainer for receiving the wireless device with the removable casing removed; a coaxial connector mounted through the retainer, the coaxial connector having a center contact and a shield contact, the coaxial connector for communicating RF test signals through a coaxial cable with external test equipment; a circuit board mounted on an inner side of the retainer and having one or more pads each for receiving one of the center and shield contacts; and, one or more probes mounted on ones of the pads for contacting ones of the RF spring connectors to distribute the RF test signals.

26 Claims, 7 Drawing Sheets

TEST FIXTURE FOR ASSEMBLED WIRELESS DEVICES

This application claims priority from U.S. Provisional Patent Application No. 60/617,657, filed Oct. 13, 2004, and incorporated herein by reference.

FIELD OF THE INVENTION

This invention relates to the field of wireless device radio frequency ("RF") testing, and more specifically, to a fixture for RF testing of wireless devices having an adapter for matching RF spring connectors to a coaxial connector (e.g., sub-miniature version A ("SMA")).

BACKGROUND

Current wireless mobile communication devices include microprocessors, information storage capability, and run one or more software applications. Examples of software applications used in these wireless devices include micro-browsers, address books, and email clients. Additionally, these generations of wireless devices have access to a plurality of services via the Internet. A wireless device may, for example, be used to browse web sites on the Internet, to transmit and receive graphics, and to execute streaming audio and/or video applications.

Wireless devices are typically fully tested before being shipped from a manufacturer's factory. This is especially important for the newer generations of wireless devices which have increased functionality as described above.

Once a wireless device is assembled in full plastics, it typically progresses through various test stages to qualify each of its components. For mobile cellular devices these tests may include the following: RF, keys, internal microphone, internal speaker, charger, buzzer, vibrator, display, etc.

With respect to RF testing, many wireless devices do not have an industry standard RF connector for connection to test equipment. Rather, these wireless devices may have a set of simple spring contacts. In addition, to connect such devices to test equipment typically requires the use of bulky external fixturing (e.g., "bulls-eye") that may not only hinder the portability of the device under test ("DUT") but may also require the partial disassembly of the DUT which in turn may compromise the integrity of the DUT.

A need therefore exists for a method and system for the efficient RF testing of assembled wireless devices. Accordingly, a solution that addresses, at least in part, the above and other shortcomings is desired.

SUMMARY

According to one aspect of the invention, there is provided a fixture for radio frequency ("RF") testing of an assembled wireless device, the wireless device having a removable casing concealing one or more RF spring connectors, the fixture comprising: a retainer for receiving the wireless device with the removable casing removed; a coaxial connector mounted through the retainer, the coaxial connector having a center contact and a shield contact, the coaxial connector for communicating RF test signals through a coaxial cable with external test equipment; a circuit board mounted on an inner side of the retainer and having one or more pads each for receiving one of the center and shield contacts; and, one or more probes mounted on ones of the pads for contacting ones of the RF spring connectors to distribute the RF test signals.

Preferably, the pads for receiving the shield contact are distributed around the pads for receiving the center contact to thereby match the impedance of the coaxial connector.

Preferably, the one or more probes are mounted on the pads for receiving the shield contact.

Preferably, the coaxial connector includes a 50 ohm coaxial connector.

Preferably, the coaxial connector includes a sub-miniature-A ("SMA") connector.

Preferably, the coaxial connector is a jack connector.

Preferably, the probes have spring-mounted tips for contacting the RF spring connectors.

Preferably, the fixture further includes a spacer for spacing the circuit board between the inner side of the retainer and the RF spring connectors.

Preferably, the spacer is a polycarbonate spacer.

Preferably, the RF testing includes temperature testing.

Preferably, the retainer has one or more clips for securely coupling the retainer to the wireless device.

Preferably, the RF testing includes environmental testing.

Preferably, the retainer is moulded for hand-gripping by a user.

Preferably, the retainer is moulded for attachment to an arm assembly of the external test equipment for manipulating the wireless device during the RF testing.

Preferably, the wireless device includes memory for storing an interactive test application for directing the wireless device in response to the RF test signals.

According to another aspect of the invention, there is provided a method for radio frequency ("RF") testing of an assembled wireless device, the wireless device having a removable casing concealing one or more RF spring connectors, the method comprising: providing a fixture having: a retainer for receiving the wireless device with the removable casing removed; a coaxial connector mounted through the retainer, the coaxial connector having a center contact and a shield contact, the coaxial connector for communicating RF test signals through a coaxial cable with external test equipment; a circuit board mounted on an inner side of the retainer and having one or more pads each for receiving one of the center and shield contacts; and, one or more probes mounted on ones of the pads for contacting ones of the RF spring connectors to distribute the RF test signals; and, applying the RF test signals to the coaxial connector.

According to another aspect of the invention, there is provided a system for radio frequency ("RF") testing of an assembled wireless device, the wireless device having a removable casing concealing one or more RF spring connectors, the system comprising: a fixture having: a retainer for receiving the wireless device with the removable casing removed; a coaxial connector mounted through the retainer, the coaxial connector having a center contact and a shield contact, the coaxial connector for communicating RF test signals; a circuit board mounted on an inner side of the retainer and having one or more pads each for receiving one of the center and shield contacts; and, one or more probes mounted on ones of the pads for contacting ones of the RF spring connectors to distribute the RF test signals; and, test equipment coupled to the coaxial connector through a coaxial cable for communicating the RF test signals.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
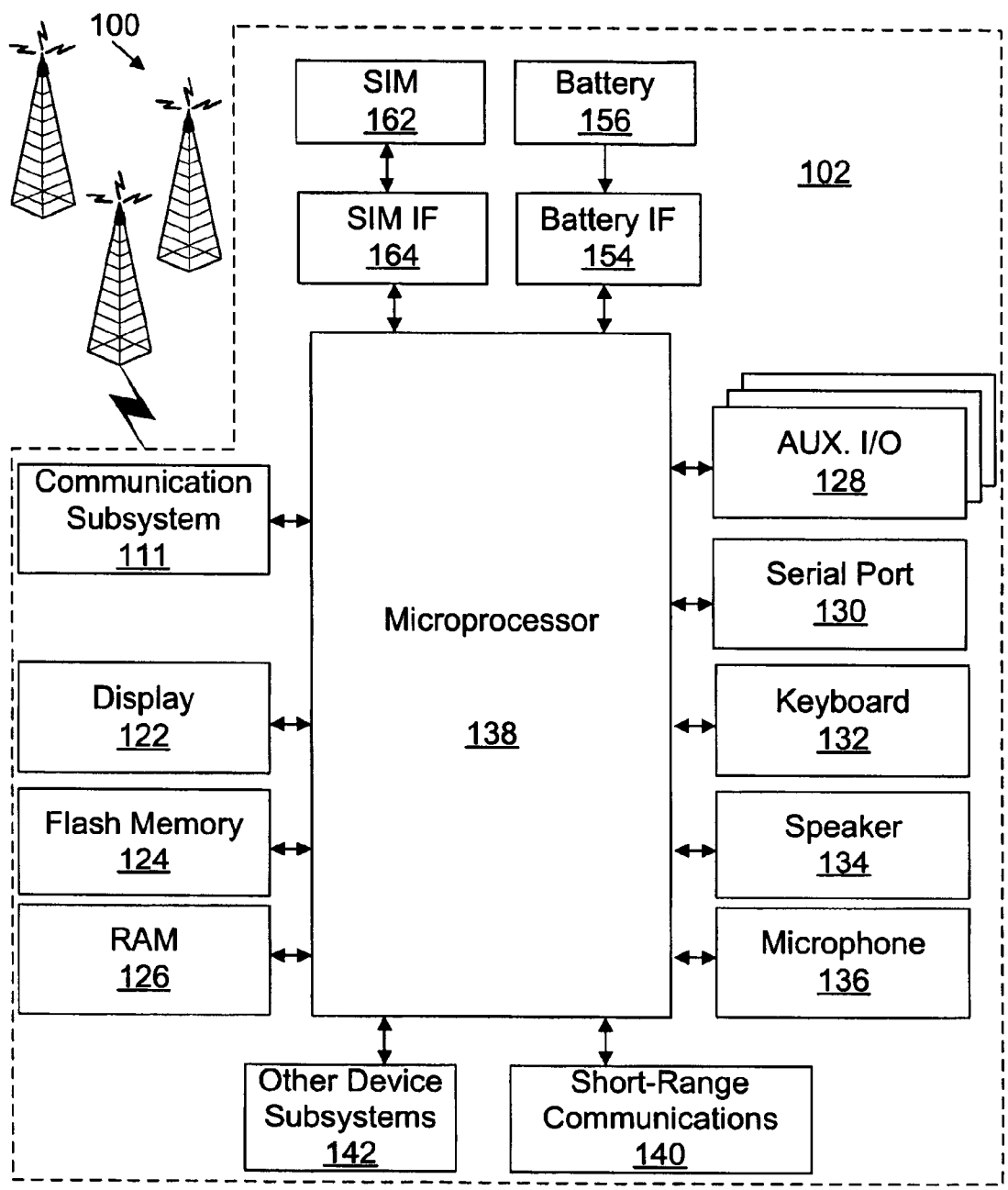
FIG. 1 is a block diagram illustrating an exemplary wireless device adapted in accordance with an embodiment of the invention.

FIG. 1 is a block diagram illustrating an exemplary wireless device 102 adapted in accordance with an embodiment of the invention. Wireless device 102 is a two-way communication device having at least voice and advanced data communication capabilities, including the capability to communicate with other computer systems. Depending on the functionality provided by device 102, it may be referred to as a data messaging device, a two-way pager, a cellular telephone with data messaging capabilities, a wireless Internet appliance, or a data communication device (with or without telephony capabilities). Device 102 may communicate with any one of a plurality of fixed transceiver stations 100 within its geographic coverage area.

Device 102 will normally incorporate a communication subsystem 111, which includes a RF receiver, a RF transmitter, and associated components, such as one or more (preferably embedded or internal) antenna elements and, local oscillators ("LOs"), and a processing module such as a digital signal processor ("DSP") (all not shown). As will be apparent to those skilled in field of communications, particular design of communication subsystem 111 depends on the communication network in which device 102 is intended to operate.

Network access is associated with a subscriber or user of device 102 and therefore device 102 requires a Subscriber Identity Module (or "SIM" card) 162 to be inserted in a SIM IF 164 in order to operate in the network. Device 102 is a battery-powered device so it also includes a battery IF 154 for receiving one or more rechargeable batteries 156. Such a battery 156 provides electrical power to most if not all electrical circuitry in device 102, and battery IF 154 provides for a mechanical and electrical connection for it. The battery IF 154 is coupled to a regulator (not shown) which provides power V+ to all of the circuitry.

Device 102 includes a microprocessor 138 which controls overall operation of device 102. Communication functions, including at least data and voice communications, are performed through communication subsystem 111. Microprocessor 138 also interacts with additional device subsystems such as a display 122, a flash memory 124 or other persistent store, a random access memory ("RAM") 126, auxiliary input/output ("I/O") subsystems 128, a serial port 130, a keyboard 132, a speaker 134, a microphone 136, a short-range communications subsystem 140, and any other device subsystems generally designated at 142. Some of the subsystems shown in FIG. 1 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list. Operating system software used by microprocessor 138 is preferably stored in a persistent store such as flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

Microprocessor 138, in addition to its operating system functions, preferably enables execution of software applications on device 102. A predetermined set of applications which control basic device operations, including at least data and voice communication applications, will normally be installed on device 102 during its manufacture. A preferred application that may be loaded onto device 102 may be a personal information manager ("PIM") application having the ability to organize and manage data items relating to the user such as, but not limited to, instant messaging ("IM"), e-mail, calendar events, voice mails, appointments, and task items. Naturally, one or more memory stores are available on device 102 and SIM 162 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on device 102 with respect to such items. This is especially advantageous where the host computer system is the mobile station user's office computer system. Additional applications may also be loaded onto device 102 through network 100, an auxiliary I/O subsystem 128, serial port 130, short-range communications subsystem 140, or any other suitable subsystem 142, and installed by a user in RAM 126 or preferably a non-volatile store (not shown) for execution by microprocessor 138. Such flexibility in application installation increases the functionality of device 102 and may provide enhanced on-device functions, communication-related functions, or both. For example, secure communication applications may enable electronic commerce functions and other such financial transactions to be performed using device 102.

In a data communication mode, a received signal such as a text message, an e-mail message, or web page download will be processed by communication subsystem 111 and input to microprocessor 138. Microprocessor 138 will preferably further process the signal for output to display 122 and/or to auxiliary I/O device 128. A user of device 102 may also compose data items, such as e-mail messages, for example, using keyboard 132 in conjunction with display 122 and possibly auxiliary I/O device 128. Keyboard 132 is preferably a complete alphanumeric keyboard and/or telephone-type keypad. These composed items may be transmitted over a communication network through communication subsystem 111 or short range communication subsystem 140.

For voice communications, the overall operation of device 102 is substantially similar, except that the received signals would be output to speaker 134 and signals for transmission would be generated by microphone 136. Alternative voice or audio I/O subsystems, such as a voice message recording subsystem, may also be implemented on device 102. Although voice or audio signal output is preferably accomplished primarily through speaker 134, display 122 may also be used to provide an indication of the identity of a calling party, duration of a voice call, or other voice call related information, as some examples.

Serial port 130 in FIG. 1 is normally implemented in a personal digital assistant ("PDA")-type communication device for which synchronization with a user's desktop computer is a desirable, albeit optional, component. Serial port 130 enables a user to set preferences through an external device or software application and extends the capabilities of device 102 by providing for information or software downloads to device 102 other than through a wireless communication network. The alternate download path may, for example, be used to load an encryption key onto device 102 through a direct and thus reliable and trusted connection to thereby provide secure device communication.

Short-range communications subsystem 140 of FIG. 1 is an additional optional component which provides for communication between device 102 and different systems or devices, which need not necessarily be similar devices. For example, subsystem 140 may include an infrared device and associated circuits and components, or a Bluetooth™ communication module to provide for communication with similarly-enabled systems and devices. Bluetooth™ is a registered trademark of Bluetooth SIG, Inc.

Figure 2:
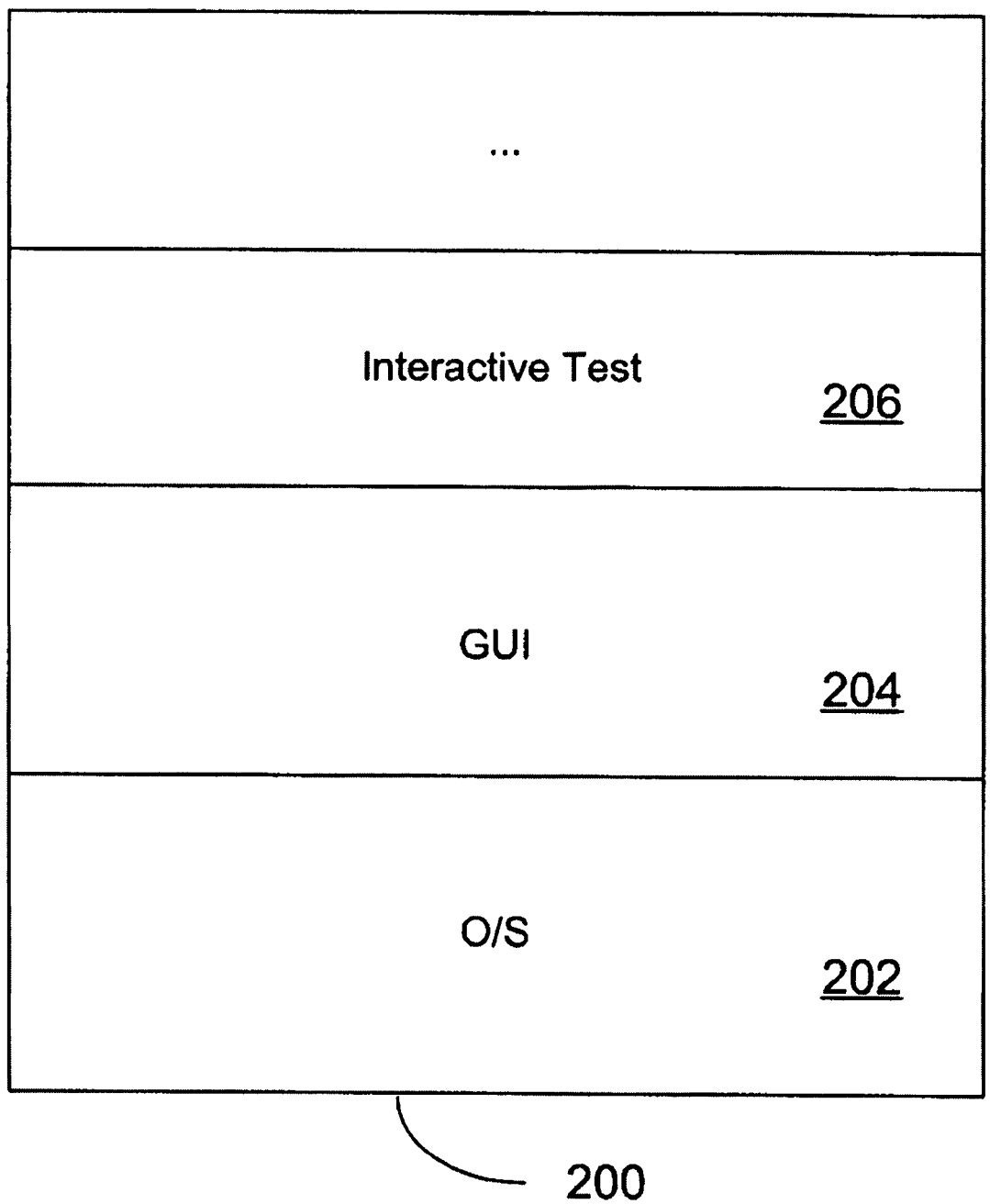
FIG. 2 is a block diagram illustrating a memory of the wireless device of FIG. 1. in accordance with an embodiment of the invention.

FIG. 2 is a block diagram illustrating a memory 200 of device 102, in accordance with an embodiment of the invention, showing various software components for controlling device 102. Memory 200 may be flash memory 124, RAM 126 or a ROM (not shown), for example. In accordance with an embodiment of the invention, device 102 is intended to be a multi-tasking wireless communications device configured for sending and receiving data items and for making and receiving voice calls. To provide a user-friendly environment to control the operation of device 102, an operating system ("O/S") 202 resident on device 102 provides a basic set of operations for supporting various applications typically operable through a graphical user interface ("GUI") 204. For example, O/S 202 provides basic input/output system features to obtain input from Auxiliary I/O 108, keyboard 132 and the like and for facilitating output to the user. In accordance with an embodiment of the invention, there is provided an interactive test application 206 for RF testing of the assembled device 102 such as during a RF test phase stage of a production line test system. Though not shown, one or more applications for managing communications or providing personal digital assistant like functions may also be included.

Figure 3:
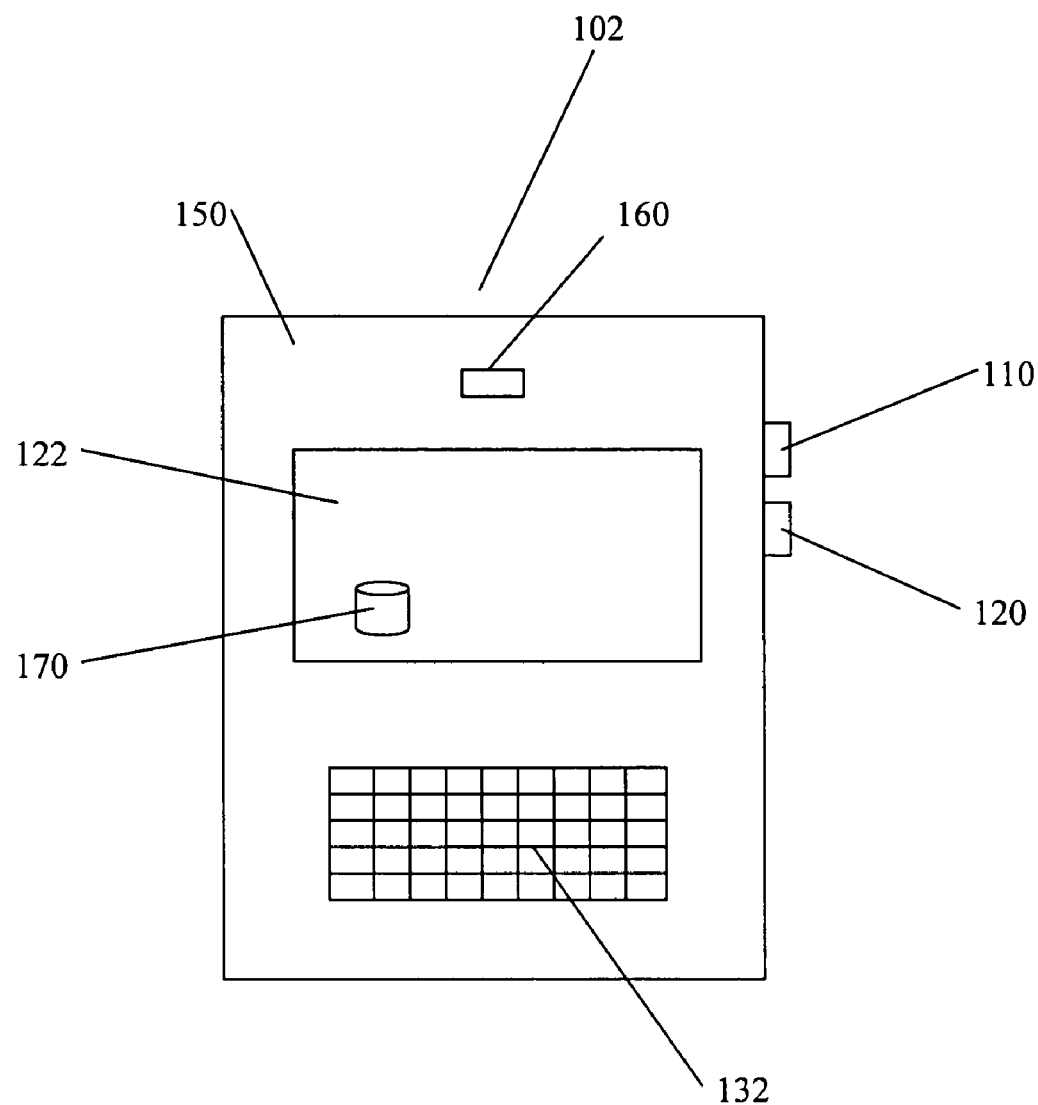
FIG. 3 is a front view illustrating the wireless device of FIG. 1 in accordance with an embodiment of the invention.

FIG. 3 is a front view illustrating the wireless device 102 of FIG. 1 in accordance with an embodiment of the invention. As mentioned above, the wireless device 102 can be a data and voice-enabled handheld. The wireless device 102 includes a casing 150, a display screen 122, a user interface 170, a keyboard 132, a thumbwheel (or trackwheel) 110, various select buttons 120, and various signal inputs/outputs 160 (e.g., power connector input, microphone, speaker, data interface input, etc.). Internally, the wireless device 102 includes one or more circuit boards, a CPU 138, memory 200, a battery 156, an antenna, etc. (not shown) which are coupled to the signal inputs/outputs 160, keyboard 132, display screen 122, etc.

Figure 4:
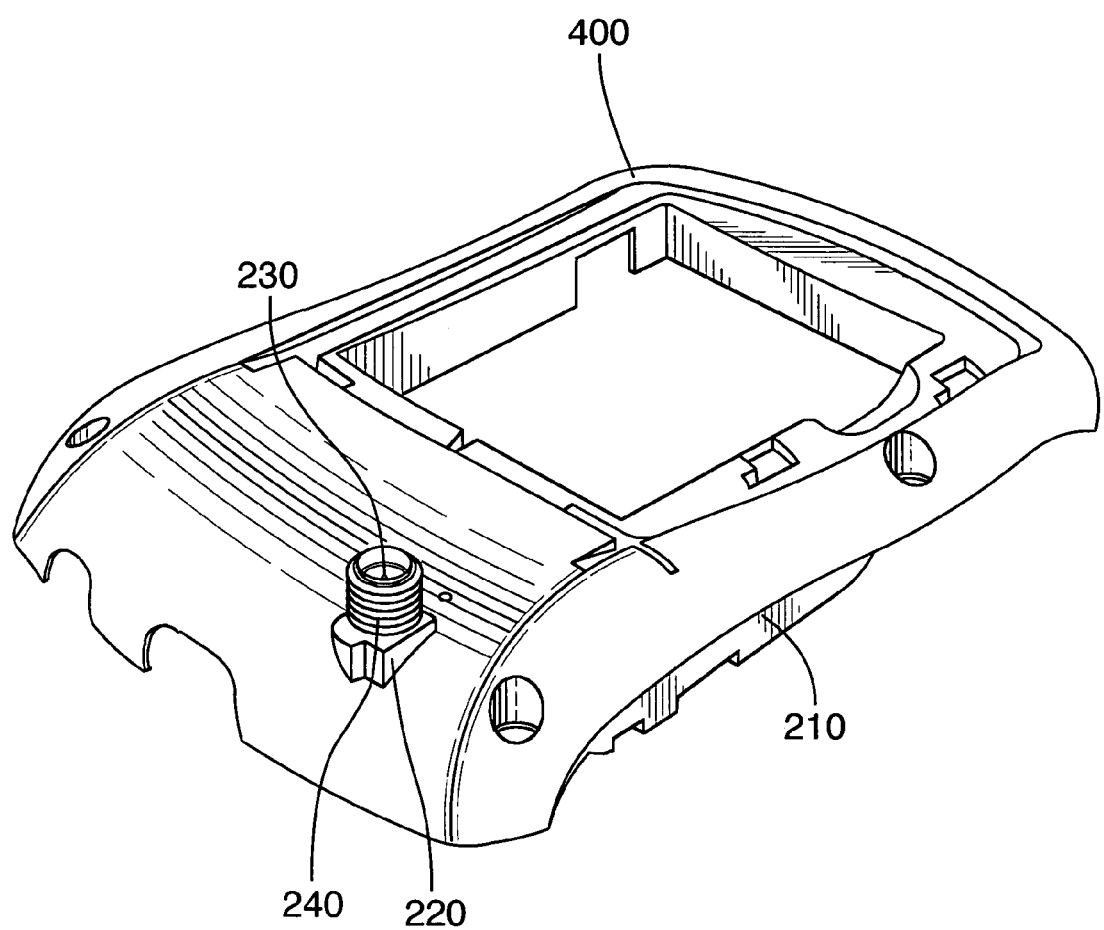
FIG. 4 is a perspective view illustrating an exterior of an RF test fixture for an assembled wireless device in accordance with an embodiment of the invention.

FIG. 4 is a perspective view illustrating an exterior of an RF test fixture 400 for an assembled wireless device 102 in accordance with an embodiment of the invention. The test fixture 400 has a retainer 210 for receiving the wireless device 102, generally after a portion (e.g., a rear portion) of the casing 150 of the wireless device 102 is removed. The retainer 210 includes a SMA connector 220 mounted thereon for connection to RF test equipment (not shown) via a coaxial cable (not shown). The SMA connector 220 shown in FIG. 2 is a SMA jack connector. The SMA connector 220 has a center contact 230 separated by a coaxial layer of insulation from a threaded shield contact 240.

As will be understood by those of ordinary skill in the art, the SMA connector 220 may be another form of 50 ohm (or other desired impedance) coaxial connector such as a sub-miniature version B ("SMB") connector.

Figure 5:
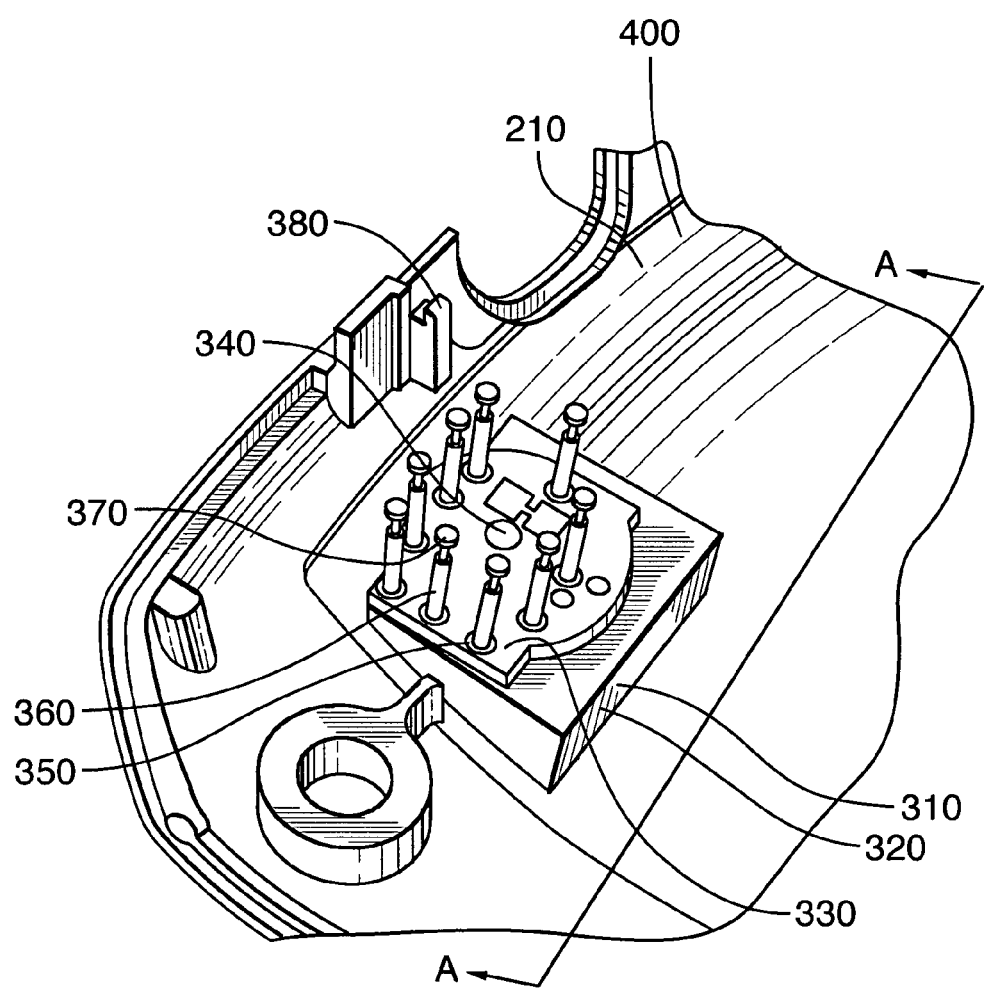
FIG. 5 is a perspective view illustrating an interior of the RF test fixture in accordance with an embodiment of the invention.

FIG. 5 is a perspective view illustrating an interior of the RF test fixture 400 in accordance with an embodiment of the invention. The SMA connector 220 passes through the retainer 210 where the center and shield contacts 230, 240 are terminated on a sealed mating assembly 310. The sealed mating assembly 310 includes, or is otherwise dimensioned to provide, a spacer 320 for aligning a printed circuit board ("PCB") 330 with spring connectors (not shown) mounted on the wireless device 102.

The PCB 330 has one or more central metal pads 340 on which the center contact 230 is terminated. Distributed around these central pads 340 are a number of shield metal pads 350 on which the shield contact 240 is terminated. A probe or pin 360 is connected to one or more of the shield pads 350 for contacting the spring connectors of the wireless device 102. Each probe 360 may include a spring-mounted tip 370 for improving contact with the spring connectors of the wireless device 102.

According to one embodiment of the invention, the shield pads 350 may be distributed around the perimeter of the PCB 330. By arranging the shield pads 350 around the central pads 340, the impedance of the connection between the spring connectors and the coaxial connector 220 is maintained at approximately 50 ohms (or other desired impedance).

The retainer 210 includes one or more clips 380 for removeably connecting the fixture 400 to the wireless device 102. These clips 380 may correspond to clips (not shown) on the portion of the casing of the wireless device 102 that has been removed. The clips 380 allow the fixture 400 to be securely connected to the wireless device 102 to, for example, enable environmental testing of the wireless device 102. Environmental testing may include temperature testing, for example. With the fixture 400 securely attached to the wireless device 102, the wireless device 102 may be tested as though it was fully assembled.

According to one embodiment of the invention, the spacer 320 may be composed of a polycarbonate material to allow the fixture 400 to be used during temperature testing of the wireless device 102. Typically, temperature testing may involve cycling the wireless device through temperature extremes often in an enclosed chamber.

According to another embodiment of the invention, the fixture 400 may be incorporated in automated test equipment (not shown). For example, the fixture 400 can be attached to an arm assembly of the automated test equipment. In this embodiment, the arm assembly can include the coaxial cable for connecting to the coaxial connector 220. The arm assembly applies the necessary pressure for engaging the clips 380 to secure the fixture 400 to the wireless device 102. In this embodiment, the fixture 400 may be considered to be a special probe that allows access to internal connectors of the wireless device 102 for RF testing while additionally enabling the wireless device 102 to undergo environmental testing.

Figure 6:
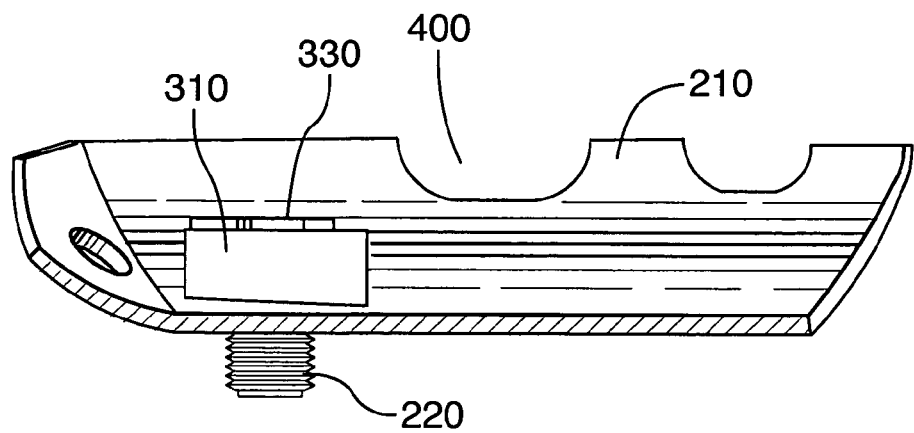
FIG. 6 is a partial cross-sectional view of the RF test fixture along line A—A of FIG. 5.
Figure 7:
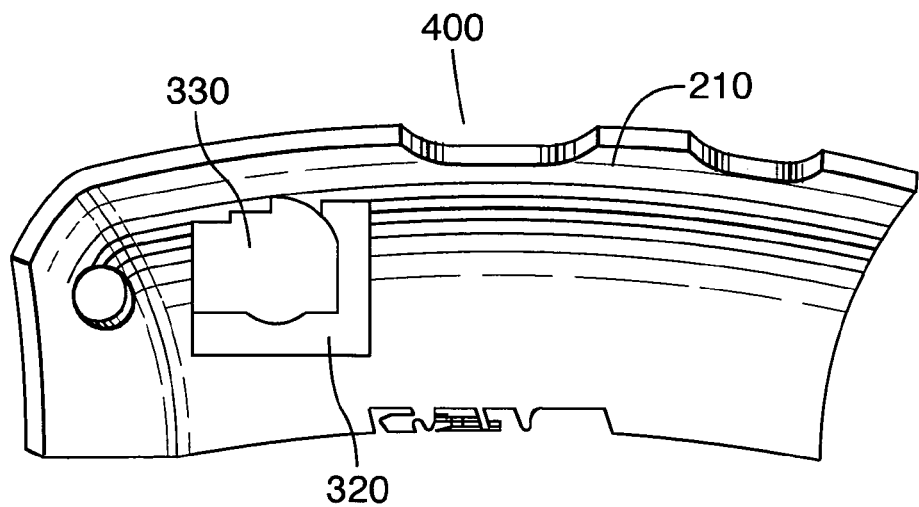
FIG. 7 is a top view of the RF test fixture of FIG. 6.
Figure 8:
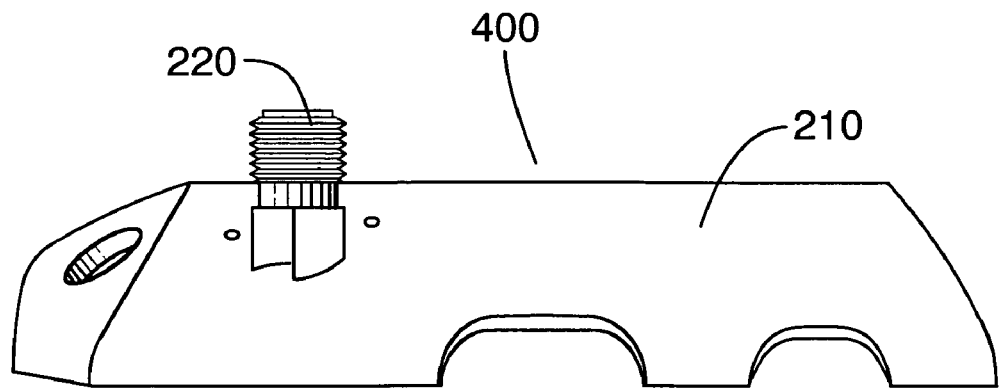
FIG. 8 is a back side view of the RF test fixture of FIG. 6.
Figure 9:
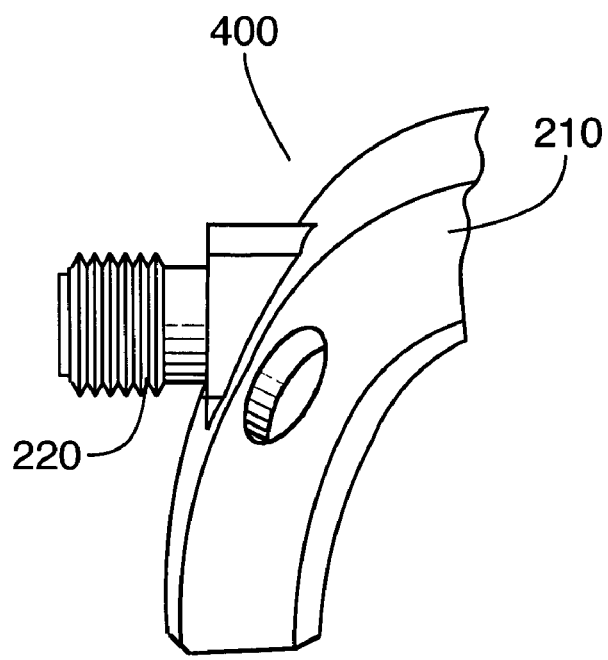
FIG. 9 is a left side detail view of the RF test fixture of FIG. 6.

To further illustrate the invention, FIG. 6 is a partial cross-sectional view of the RF test fixture 400 along line A—A of FIG. 5. FIG. 7 is a top view of the RF test fixture 400 of FIG. 6. FIG. 8 is a back side view of the RF test fixture 400 of FIG. 6. And, FIG. 9 is a left side detail view of the RF test fixture 400 of FIG. 6.

Thus, the present invention provides a test fixture 400 for assembled wireless device testing having an industry standard connection 220 to simple spring contacts. This is accomplished through the use of a mechanical retainer 210 in conjunction with the housing of the wireless device 102 to precisely align a sealed mating assembly 310. The mating assembly 310 contains pads 340, 350 arranged in a coaxial arrangement that contact the spring connectors on the DUT and maintain an approximate 50 ohm impedance (or other desired impedance). Advantageously, the fixture 400 has matching components incorporated directly therein resulting in a compact integrated solution for RF and environmental testing of wireless devices.

The embodiments of the invention described above are intended to be exemplary only. The scope of the invention is therefore intended to be limited solely by the scope of the appended claims.

What is claimed is:

1. A fixture for radio frequency ("RF") testing of an assembled wireless device, the wireless device having a removable casing concealing one or more RF spring connectors, the fixture comprising:
   a retainer for receiving the wireless device with the removable casing removed;
   a coaxial connector mounted through the retainer, the coaxial connector having a center contact and a shield contact, the coaxial connector for communicating RF test signals through a coaxial cable with external test equipment;
   a circuit board mounted on an inner side of the retainer and having one or more pads each for receiving one of the center and shield contacts; and,
   one or more probes mounted on ones of the pads for contacting ones of the RF spring connectors to distribute the RF test signals.

2. The fixture of claim 1 wherein the pads for receiving the shield contact are distributed around the pads for receiving the center contact to thereby match the impedance of the coaxial connector.

3. The fixture of claim 2 wherein the one or more probes are mounted on the pads for receiving the shield contact.

4. The fixture of claim 1 wherein the coaxial connector is at least one of a 50 ohm coaxial connector, a sub-miniature-A ("SMA") connector, and a jack connector.

5. The fixture of claim 1 wherein the probes have spring-mounted tips for contacting the RF spring connectors.

6. The fixture of claim 1 and further comprising a spacer for spacing the circuit board between the inner side of the retainer and the RF spring connectors.

7. The fixture of claim 6 wherein the spacer is a polycarbonate spacer.

8. The fixture of claim 7 wherein the RF testing includes temperature testing.

9. The fixture of claim 1 wherein the retainer has one or more clips for securely coupling the retainer to the wireless device.

10. The fixture of claim 9 wherein the RF testing includes environmental testing.

11. The fixture of claim 1 wherein the retainer is moulded for hand-gripping by a user.

12. The fixture of claim 1 wherein the retainer is moulded for attachment to an arm assembly of the external test equipment for manipulating the wireless device during the RF testing.

13. The fixture of claim 1 wherein the wireless device includes memory for storing an interactive test application for directing the wireless device in response to the RF test signals.

14. A method for radio frequency ("RF") testing of an assembled wireless device, the wireless device having a removable casing concealing one or more RF spring connectors, the method comprising:
   providing a fixture having: a retainer for receiving the wireless device with the removable casing removed; a coaxial connector mounted through the retainer, the coaxial connector having a center contact and a shield contact, the coaxial connector for communicating RF test signals through a coaxial cable with external test equipment; a circuit board mounted on an inner side of the retainer and having one or more pads each for receiving one of the center and shield contacts; and, one or more probes mounted on ones of the pads for contacting ones of the RF spring connectors to distribute the RF test signals; and,
   applying the RF test signals to the coaxial connector.

15. The method of claim 14 wherein the pads for receiving the shield contact are distributed around the pads for receiving the center contact to thereby match the impedance of the coaxial connector.

16. The method of claim 15 wherein the one or more probes are mounted on the pads for receiving the shield contact.

17. The method of claim 14 wherein the coaxial connector is at least one of a 50 ohm coaxial connector, a sub-miniature-A ("SMA") connector, and a jack connector.

18. The method of claim 14 wherein the probes have spring-mounted tips for contacting the RF spring connectors.

19. The method of claim 14 wherein the fixture has a spacer for spacing the circuit board between the inner side of the retainer and the RF spring connectors.

20. The method of claim 19 wherein the spacer is a polycarbonate spacer.

21. The method of claim 20 wherein the RF testing includes temperature testing and further comprising the step of applying temperature variations to the wireless device.

22. The method of claim 14 wherein the retainer has one or more clips for securely coupling the retainer to the wireless device.

23. The method of claim 22 wherein the RF testing includes environmental testing and further comprising the step of applying environmental variations to the wireless device.

24. The method of claim 14 wherein the retainer is moulded for hand-gripping by a user.

25. The method of claim 14 wherein the retainer is moulded for attachment to an arm assembly of the external test equipment for manipulating the wireless device during the RF testing.

26. The method of claim 14 wherein the wireless device includes memory and further comprising the step of storing an interactive test application in the memory for directing the wireless device in response to the RF test signals.

* * * * *